United States Patent [19]

Bott

[11] Patent Number: 4,516,709
[45] Date of Patent: May 14, 1985

[54] VEHICLE ARTICLE CARRYING DEVICE

[76] Inventor: John A. Bott, 931 Lakeshore Dr., Grosse Pointe Shores, Mich. 48236

[21] Appl. No.: 512,394

[22] Filed: Jul. 11, 1983

[51] Int. Cl.$^3$ .............................................. B60R 9/12
[52] U.S. Cl. .................................. 224/315; 224/319; 224/321; 224/325
[58] Field of Search ............... 224/315, 319, 321, 322, 224/323, 324, 325, 326

[56] References Cited

U.S. PATENT DOCUMENTS

| | | | |
|---|---|---|---|
| 2,772,824 | 12/1956 | Binding | 224/319 |
| 3,223,306 | 12/1965 | Helm | 224/325 X |
| 4,245,764 | 1/1981 | Kowalski et al. | 224/325 X |
| 4,261,496 | 4/1981 | Mareydt et al. | 224/321 X |
| 4,274,568 | 6/1981 | Bott | 224/319 |
| 4,358,037 | 11/1982 | Heideman | 224/321 |
| 4,364,500 | 12/1982 | Bott | 224/325 |

Primary Examiner—Steven M. Pollard
Attorney, Agent, or Firm—Harness, Dickey & Pierce

[57] ABSTRACT

A vehicle article carrier for the horizontal body surface of an automotive vehicle comprising a cross member adjustably secured by clamping means and an article restraining member adjustably and removably mounted to the cross member and cooperable with the cross member to restrain articles disposed on the carrier. The article restraining member may also have additional article securing elements incorporated into its construction. A lock mechanism may also be readily incorporated into the carrier.

15 Claims, 6 Drawing Figures

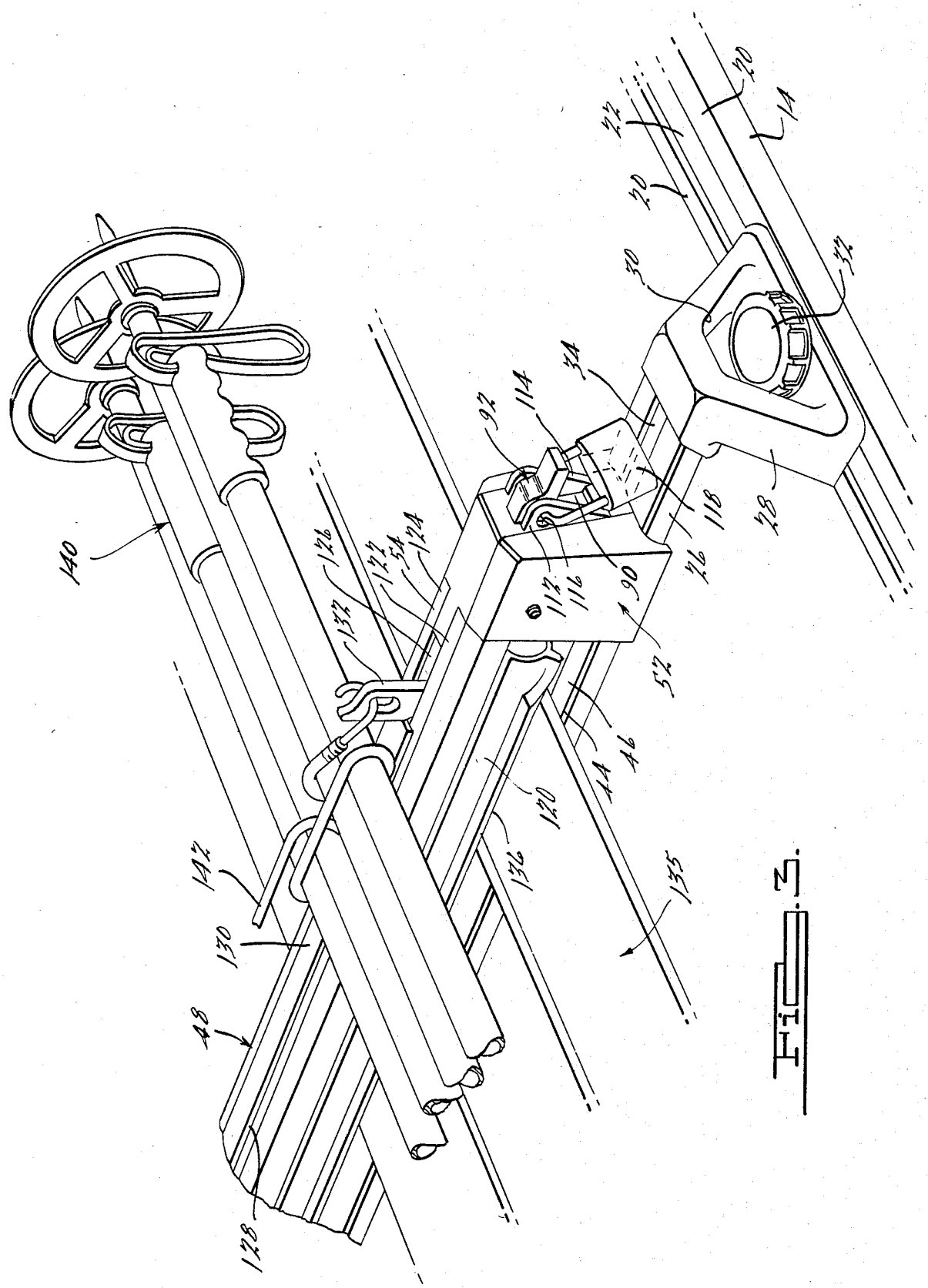

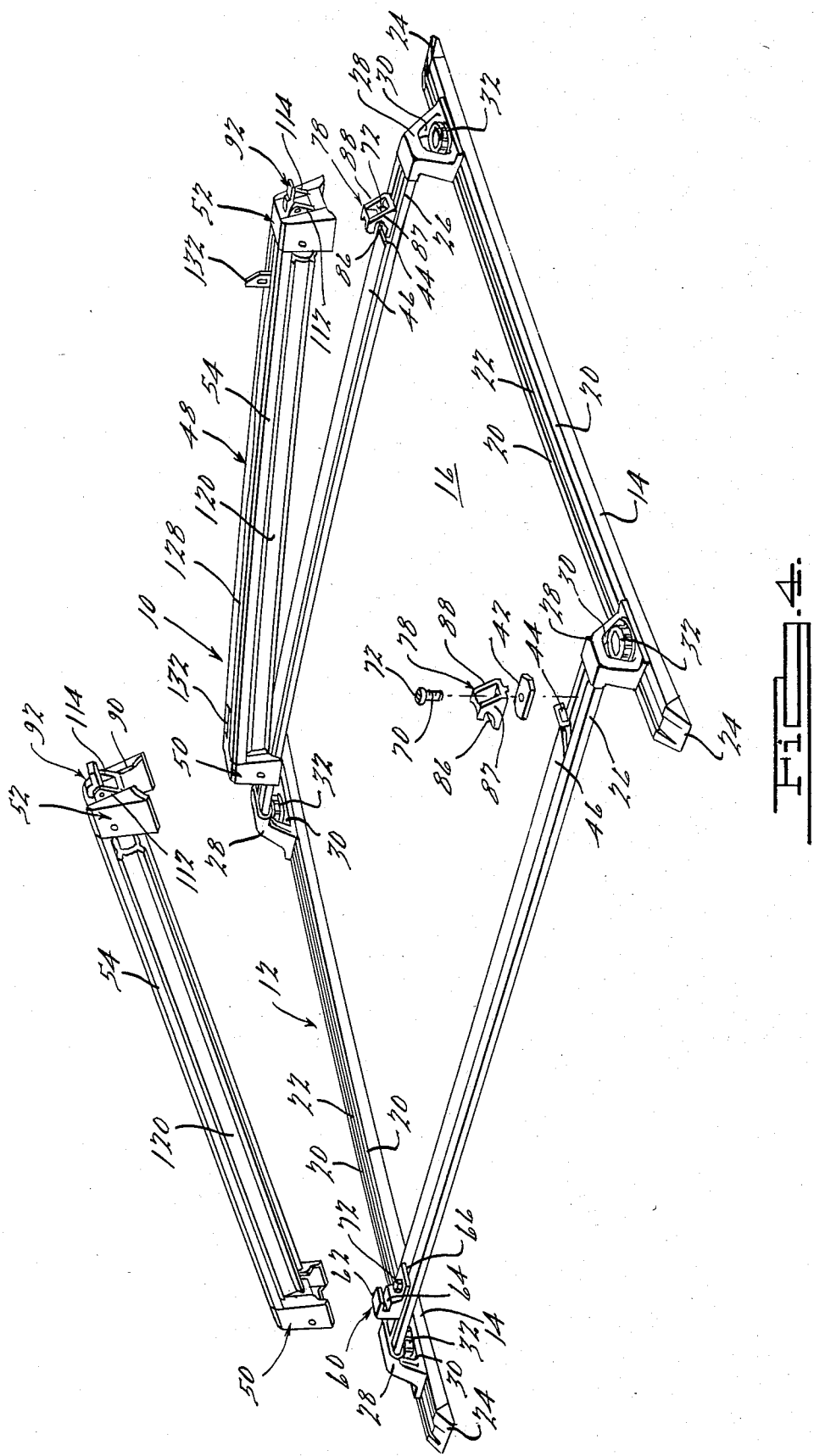

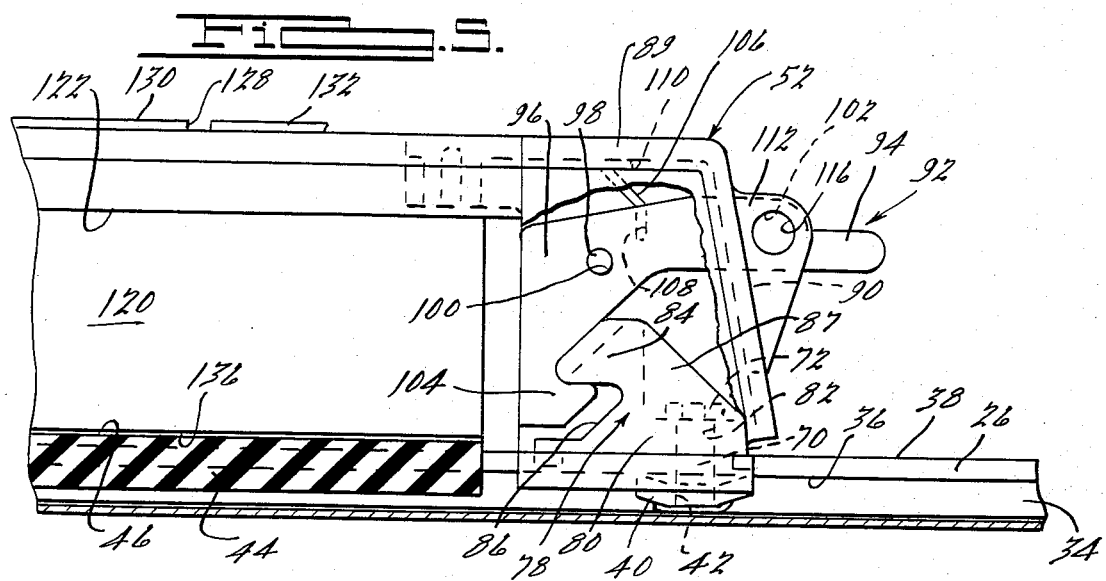
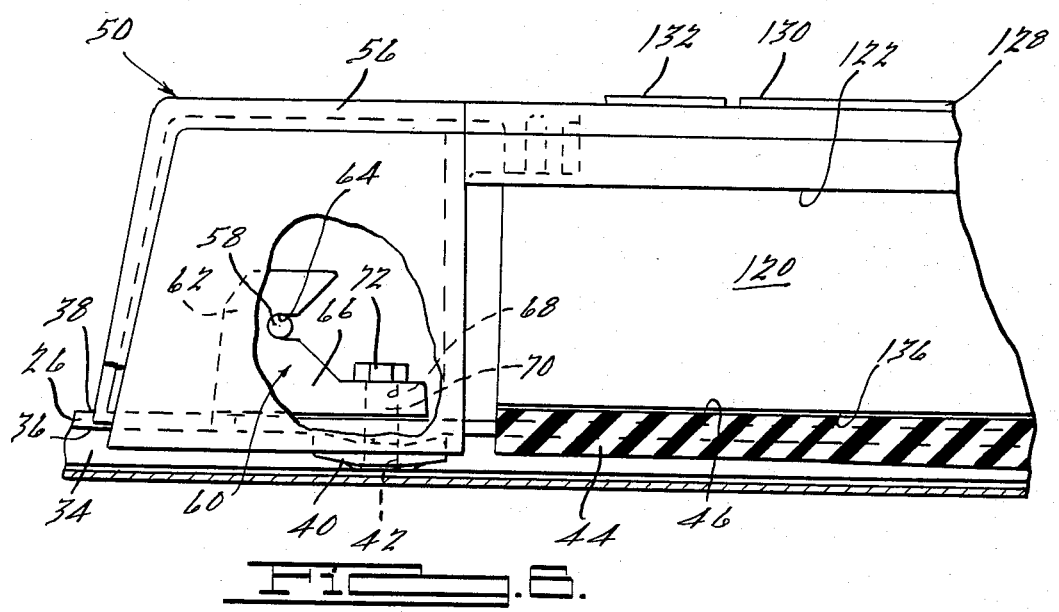

VEHICLE ARTICLE CARRYING DEVICE

BACKGROUND AND SUMMARY OF THE INVENTION

The present invention is generally directed toward a new and improved vehicle article carrying device of the type comprising at least a pair of longitudinally extending, laterally spaced apart slats to which article carrying accessories may be attached. More particularly, the present invention relates to an article carrying device capable of carrying skis along with a further capability of carrying other loads either in combination with skis or separately.

Slat-type adjustable luggage carriers for automotive vehicles have become very commercially successful. Examples of such luggage carriers are illustrated and claimed in applicant's prior U.S. Pat. Nos. 4,099,658; 4,182,971; 4,015,760; 4,239,139; and others.

The present invention integrates the advantages of the slat-type adjustable luggage carrier with a unique device capable of holding snow skis, water skis, and other apparatus either in combination with skis or separately in a unique manner. The device is completely removable from the carrier, yet also includes a locking mechanism to safeguard articles carried on the device when left unattended on an automotive vehicle.

A further feature is the addition of slideable article restraining members at the upper surfaces of the article restraining device for attachment of additional articles, such as ski poles, to the device.

All of the above features are provided in a readily removable, aesthetically appealing article carrying device, easy to operate and secure, and integrated with the adjustability features of the basic article carrier to which it is attached while doing little to diminish other article retaining features of the basic article carrier.

Other features and advantages of the present invention will be apparent from the following specification and claims and the attached drawings.

BRIEF DESCRIPTION OF THE DRAWINGS

FIG. 3 is an enlarged elevated perspective view of one corner of the device of FIG. 2 with additional articles secured to the upper surfaces of the device;

FIG. 4 is an exploded elevated perspective view of the device of FIGS. 1 and 2;

FIG. 5 is a front sectional view of one of the brackets of the device of FIGS. 1 and 2; and FIG. 6 is a front sectional view of the other bracket of the device of FIGS. 1 and 2.

DETAILED DESCRIPTION OF THE PREFERRED EMBODIMENTS

Figure 1:
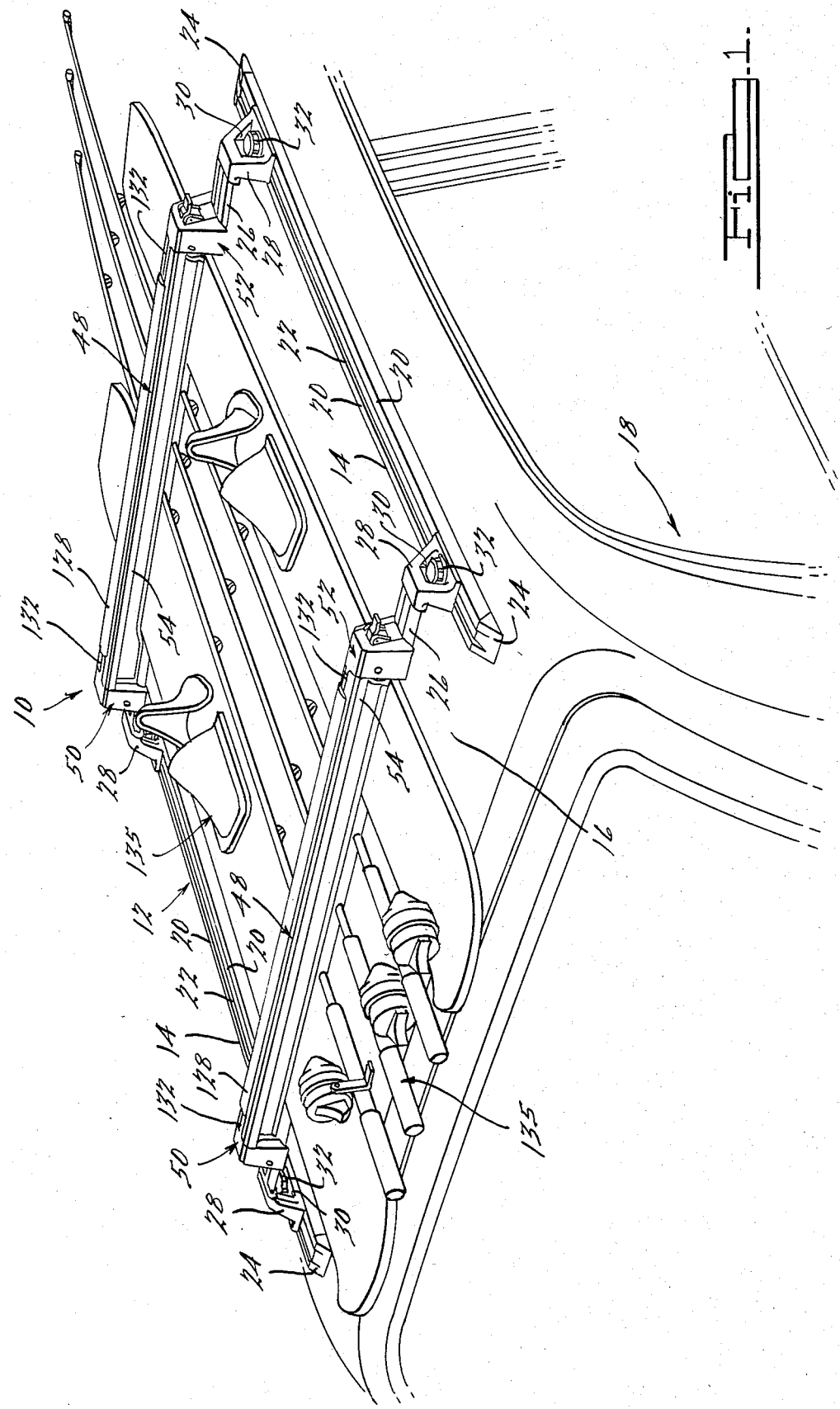
FIG. 1 is an elevated perspective view of an article carrying device of the present invention with articles secured thereon principally suitable for use in warm weather.
Figure 2:
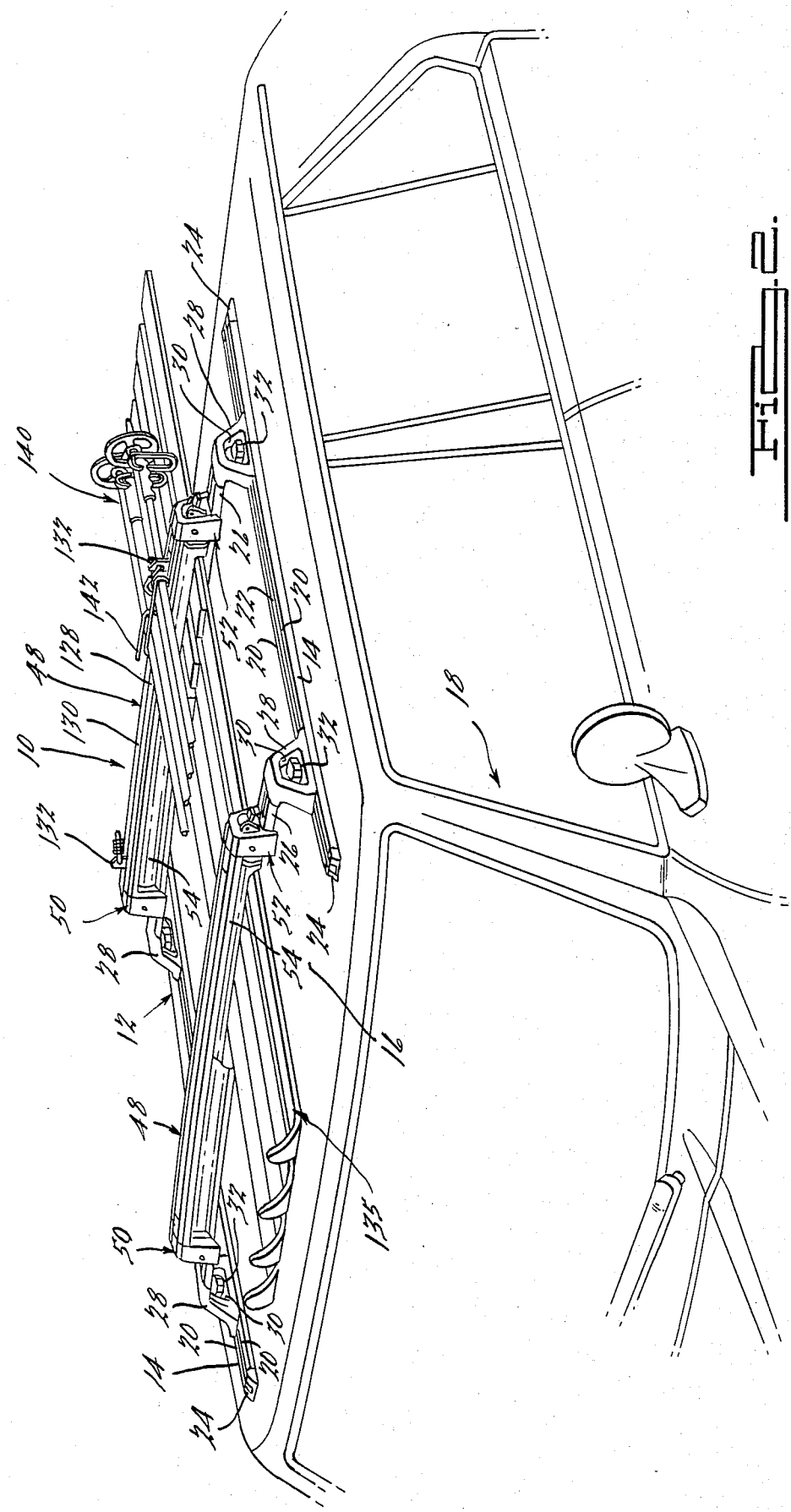
FIG. 2 is an elevated perspective view of the device of FIG. 1 with articles secured thereon principally suitable for use in cold weather.

Referring to FIGS. 1 and 2, a vehicle article carrying device 10 is shown integrated into an article carrier 12 similar to that illustrated and described in applicant's prior U.S. Pat. No. 4,239,139, issued Dec. 16, 1980. A pair of slats 14 are fixedly mounted to a horizontally extending body surface 16 of an automotive vehicle 18. The slats 14 include upper article supporting surfaces 20, a longitudinally extending channel 22 having clamping surfaces interior of the channel as described in applicant's above-mentioned patent and end caps 24 and the ends of the slats 14. A pair of elevated cross rails 26 extend transversely of the slats 14 and body surface 16 having brackets 28 at the ends thereof. The brackets 28 include a tie down portion 30 and a manually engageable clamping mechanism 32 which interacts with the clamping surfaces of the slats 14 to operably secure the cross rails 26 in a selected position. The clamping mechanism 32 and slat 14 may be one of several varieties, including, but not limited to the various forms of clamping illustrated in applicant's prior U.S. Pat. No. 4,099,658, issued July 11, 1978.

Referring to FIGS. 3, 4, 5 and 6, each cross rail 26 in turn includes a channel 34 having internal clamping surfaces 36 (FIGS. 5 and 6) and upper article supporting surfaces 38. Within the channel is a clamping element in the form of a nut 40 having a threaded bore 42 extending through it. A polyurethane insert 44 is press fit into the channel 34 with the upper surface 46 of the insert 44 forming a continuous resilient support surface. The insert 44 illustrated only extends an intermediate length of each cross rail 26 to provide access for a clamping mechanism as will be discussed below. Use of an alternative form of clamping means, such as those illustrated in FIGS. 14 to 17 of applicant's U.S. Pat. No. 4,295,587, issued Oct. 20, 1981, would permit the insert to extend the length of the cross rail 26.

Mounted onto each cross rail 26 is an article restraining member 48 comprising two brackets 50 and 52 and a restraint element 54 extending between and telescopically engageable with both brackets 50, 52. The first bracket 50 (FIG. 6) comprises a shell housing 56 having a post 58 extending across a lower portion thereof. A first hook 60 is clampingly engaged to the cross rail 26. The hook 60 comprises a vertically extending portion 62 including a recess 64 and a horizontally extending portion 66 including an aperture 68. A manually engageable threaded clamping element, such as a bolt 70 having a head 72, is positioned through the hook aperture 68 into engagement with the threaded bore 42 of one of the clamping elements 40.

The head 72 of the bolt 70 forces the horizontally extending portion 66 of the hook 60 downwardly and the clamping element 40 is threadably forced upwardly to clampingly engage the hook 60 to the cross rail 26. The post 58 of the first bracket 50 is then disposed in the recess 64 of the hook 60 to engage the bracket 50 with the cross rail 26.

A second hook 78 (FIG. 5) comprised of a horizontally extending portion 80, having an aperture 82, and a vertically extending portion 84, having a notch 86 and buttress portions 87 and 88 (FIG. 4), is clampingly engaged to the cross rail 26 at substantially the opposite extreme of the cross rail 26 from the position of the first hook 60. A manually engageable threaded clamping element, again such as bolt 70 having a head 72, is positioned through the hook aperture 82 into engagement with the threaded bore 42 in one of the clamping elements 40. The head 72 of the bolt 70 forces the horizontally extending portion 80 of the second hook 78 downwardly and the clamping element 40 is threadably forced upwardly to clampingly engage the hook 78 to the cross rail 26.

The second bracket 52 also comprises a shell housing 89 and has a slot 90 (FIG. 4) disposed at one side thereof. A trigger element 92 comprised of two arm portions 94 and 96 extending substantially perpendicularly to one another and integral with one another, is rotatably disposed on a post 98, which post 98 is mounted across the shell housing 89 of the second bracket 52 and through an aperture 100 disposed in an intermediate position of the trigger element 92 in a manner such that the first arm 94 of the trigger element 92 extends through the slot 90 of the second bracket 52. The first arm 94 of the trigger element 92 includes an aperture 102 which is disposed externally of the bracket 52 when the arm 94 is disposed substantially horizontally, which is where it is disposed at its upwardmost position of travel. The second arm 96 of the trigger element 92 has a hook 104 at substantially one extreme.

The trigger element 92 rotates on an axis of rotation formed by the post 98 so that when the second bracket 52 is placed on the cross rail 26 and the second hook 78 is properly positioned, the hook 104 of the trigger element 92 engages the notch 86 of the second hook 78 to operably secure the second bracket 52 to the cross rail 26. The trigger element 92 is biased into this engagement position by a leaf spring 106 fit into recess 108 in arm 94 of the trigger element 92 and abutting the undersurface 110 of the bracket housing 89.

One flange 112 or 114 is disposed on each side of the slot 90 in the second bracket 52. Each flange 112, 114 has an aperture 116 extending horizontally through the flanges 112, 114 and aligned so that the aperture 102 of the trigger element 92 aligns with both apertures 116 of the flanges 112, 114 when the trigger element 92 is operably engaged with the second hook 78 to secure the second bracket 52 to the cross rail 26. A suitable lock 118 (FIG. 3) can then be disposed through the apertures 102 and 116 to lock the entire assembly to the cross rail 26.

Each restraint element 54 of the article restraining member 48 includes a flexible restraining wall 120 extending substantially from first bracket 50 to second bracket 52 along the underside 122 of member 54. When the brackets 50 and 52 are operably secured to the cross rail 26, the wall 120 will abut the upper surface 46 of the insert 44 of the cross rail along the length of the insert 44.

The top of the restraint element 54 of the member 48 has a pair of upper article supporting surfaces 122 and 124, a channel 126, and a resilient insert 128 similar to insert 44 and having an upper article supporting surface 130. At each end of the insert 128 are tie downs such as pop-up tie down members 132, as described in applicant's co-pending application Ser. No. 335,703, filed Dec. 30, 1981, or other tie downs, such as those described in applicant's U.S. Pat. No. 4,239,139, issued Dec. 16, 1980. With the tie down members 132 shown, a base portion is disposed in the channel and a tie down portion, including a tie down aperture, is rotatably secured to the base member to clampingly engage the base member and tie down portion against the clamping surfaces within the channel in an operable position, as shown in FIG. 3, yet remain hidden when not in use (FIGS. 5 and 6).

In operation, articles 135 are disposed on the cross rails 26. The first hook 60 and second hook 78 are properly located on the cross rail 26. The post 58 of the first bracket 50 is engaged with the first hook 60 and the restraint element 54 is rotated downwardly onto the articles 135 to engage the articles 135 principally between the upper surface 46 of the cross rail insert 44 and the lower surface 136 of the flexible wall 120 of the restraint element 54. The second bracket 52 is disposed over the second hook 78 and the trigger element 92 is engaged with the second hook 78. A lock 120 may then be disposed through apertures 102, 116 and 118 to lock the articles 135 to the carrier 12.

The tie downs 132 can then be operably disposed and further articles 140 can be positioned on the upper surfaces 130 of the channel insert 128 of the element 54. Rope, bungee cords 142, or the like may then be utilized to secure the articles 140 to the carrier 12.

Thus, there is disclosed in the above description and in the drawings a Vehicle Article Carrying Device which fully and effectively accomplishes the objectives thereof. Any dimensions set forth in the above specification are merely representative and are not meant to be limiting on the scope of the invention. It will be apparent that variations and modifications of the disclosed embodiments may be made without departing from the principles of the invention or the scope of the appended claims.

I claim:

1. A vehicle article carrier for the horizontal body surface of an automotive vehicle comprising:
    a cross member extending laterally of said body surface, having an article engaging surface;
    first and second bracket means;
    means for removably and adjustably mounting said first and second bracket means to said cross member;
    means for removably clampingly engaging said mounting means to said cross member; and
    an article restraint element extending between and secured to said first and second bracket means;
    wherein said bracket means includes a housing which combines with said cross member to encapsulate said mounting means and said engaging means and said article restraint element and said article engaging surface of said cross member cooperate to restrain articles disposed upon said carrier.

2. An article carrier in accordance with claim 1, wherein said article engaging surface is an upper article supporting surface of said cross member.

3. An article carrier in accordance with claim 2, wherein said cross member includes a channel.

4. An article carrier in accordance with claim 3, wherein said cross member includes an insert disposed in said channel, said insert having a substantially flat outer surface, and said upper supporting surface is comprised at least in part of said outer surface of said insert.

5. An article carrier in accordance with claim 2, wherein said mounting means comprises first and second mounting means and second bracket means is removably mounted to said second mounting means.

6. An article carrier in accordance with claim 5, wherein said second mounting means includes a hook portion and said second bracket means includes means for engaging said hook portion to secure said second bracket means to said cross member.

7. An article carrier in accordance with claim 6, wherein said means for engaging comprises trigger means including a hook portion which engages said hook portion of said second mounting means to operably engage said second bracket means to said cross member.

8. An article carrier in accordance with claim 6, wherein said engaging means is biased into an engagement position.

9. An article carrier in accordance with claim 1, wherein said cross member is elevated from said body surface.

10. An article carrier in accordance with claim 1, wherein said mounting means comprises first and second mounting means and said first bracket means is rotatably and removably mounted to said first mounting means.

11. An article carrier in accordance with claim 10, wherein said first mounting means includes a hook portion and said first bracket means includes a post which engages said hook portion of said first mounting means.

12. An article carrier in accordance with claim 1, wherein said article restraint element includes upper article supporting surfaces, and said carrier further comprises article securing means and means for clamping said article securing means to said article restraining member.

13. An article carrier in accordance with claim 12, wherein said article restraint element includes a longitudinally extending channel having clamping surfaces interior of said channel, and said article securing means comprises tie down means clampingly engageable to said clamping surfaces by said clamping means.

14. An article carrier in accordance with claim 1, further comprising means for locking said article restraint element to said cross member.

15. A vehicle article carrier for the horizontal body surface of an automotive vehicle comprising:
   a pair of slat elements;
   at least one bracket disposed on each slat including means for adjustably and removably clamping each of said brackets to one of said slats;
   a cross member extending between said slats from a first bracket disposed on one of said slats to a second bracket disposed on the other of said slats; and
   an article restraining member removably and clampingly engaged solely to said cross member independently of said brackets, including an article restraint element, means for rotatably mounting said element to said cross member, and means for clampingly engaging said mounting means to said cross member wherein said bracket means includes a housing which combines with said cross member to cover said mounting means and said engaging means.

* * * * *